(12) United States Patent
Li

(10) Patent No.: US 9,909,283 B2
(45) Date of Patent: Mar. 6, 2018

(54) IMAGE DISPLAY APPARATUS FOR SHOVEL

(71) Applicant: SUMITOMO HEAVY INDUSTRIES, LTD., Tokyo (JP)

(72) Inventor: Shipeng Li, Harbin (CN)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/301,419

(22) Filed: Jun. 11, 2014

(65) Prior Publication Data
US 2014/0288771 A1     Sep. 25, 2014

Related U.S. Application Data

(63) Continuation of application No. PCT/JP2012/080517, filed on Nov. 26, 2012.

(30) Foreign Application Priority Data

Dec. 26, 2011   (JP) ................................. 2011-284095

(51) Int. Cl.
*E02F 9/26*  (2006.01)
*G01C 21/00* (2006.01)
(Continued)

(52) U.S. Cl.
CPC .............. *E02F 9/261* (2013.01); *E02F 9/205* (2013.01); *G06K 9/00791* (2013.01);
(Continued)

(58) Field of Classification Search
CPC . G06F 11/32; E02F 9/261; E02F 9/264; E02F 3/32; E02F 3/76; E02F 9/24;
(Continued)

(56) References Cited

U.S. PATENT DOCUMENTS

| 6,736,216 | B2 * | 5/2004 | Savard ................. E01C 19/006 172/1 |
| 7,777,953 | B2 * | 8/2010 | Kaule ........................... 359/566 |

(Continued)

FOREIGN PATENT DOCUMENTS

| CN | 201901886 U | 7/2011 |
| JP | 01-165829 | 6/1989 |

(Continued)

OTHER PUBLICATIONS

International Search Report dated Jan. 15, 2013.

*Primary Examiner* — Thomas G Black
*Assistant Examiner* — Demetra Smith-Stewart
(74) *Attorney, Agent, or Firm* — IPUSA, PLLC

(57) ABSTRACT

An image display apparatus for a shovel that includes a lower-part traveling body, an upper-part turning body turnably placed on the lower-part traveling body, and an attachment mounted on the upper-part turning body, and performs work in a work area by driving the attachment, includes an image display part configured to display the work area to be subjected to the work. An image of the work area captured with an image capturing device is subjected to image processing to add and indicate a distribution of depressions and elevations of the work area, and is displayed on the image display part.

11 Claims, 4 Drawing Sheets

(51) Int. Cl.
*G06F 7/00* (2006.01)
*G06K 9/00* (2006.01)
*E02F 9/20* (2006.01)
*H04N 7/18* (2006.01)

(52) U.S. Cl.
CPC .......... *H04N 7/185* (2013.01); *B60R 2300/80* (2013.01); *H04N 7/18* (2013.01)

(58) Field of Classification Search
CPC ...... E02F 9/26; G06T 11/60; B60R 2011/004; B60R 11/04; B60R 1/002; G06K 9/00791; G06K 9/00664
See application file for complete search history.

(56) References Cited

U.S. PATENT DOCUMENTS

| | | | |
|---|---|---|---|
| 7,817,021 B2* | 10/2010 | Date et al. ...................... | 340/438 |
| 8,272,467 B1* | 9/2012 | Staab ........................ | E02F 9/26 172/2 |
| 8,437,920 B2* | 5/2013 | Hobenshield et al. ....... | 340/438 |
| 8,498,806 B2* | 7/2013 | Fukano .................. | E02F 9/261 701/23 |
| 8,847,745 B2* | 9/2014 | Shibamori ............. | E02F 9/267 340/438 |
| 8,903,604 B2* | 12/2014 | Fukano et al. .................. | 701/36 |
| 2003/0000115 A1 | 1/2003 | Green et al. | |
| 2005/0027420 A1 | 2/2005 | Fujishima et al. | |
| 2005/0151845 A1* | 7/2005 | Tsukada et al. .............. | 348/148 |
| 2006/0034535 A1 | 2/2006 | Koch et al. | |
| 2008/0133128 A1* | 6/2008 | Koch ...................... | E02F 3/435 37/348 |
| 2008/0180523 A1 | 7/2008 | Stratton et al. | |
| 2009/0062971 A1* | 3/2009 | Rottig ..................... | G01S 19/14 701/2 |
| 2009/0256860 A1* | 10/2009 | Nichols .................. | G01S 19/40 345/632 |
| 2009/0259483 A1* | 10/2009 | Hendrickson et al. ........... | 705/1 |
| 2011/0044505 A1* | 2/2011 | Lim ........................ | F16P 3/142 382/103 |
| 2012/0236142 A1* | 9/2012 | Enix ..................... | E02F 9/2045 348/118 |
| 2013/0092610 A1* | 4/2013 | Lamonte ............... | E02B 15/048 210/85 |
| 2013/0155240 A1* | 6/2013 | Mitsuta ..................... | B60R 1/00 348/148 |
| 2013/0158797 A1* | 6/2013 | Fukano et al. .................. | 701/36 |
| 2013/0182066 A1* | 7/2013 | Ishimoto ................ | H04N 7/181 348/38 |
| 2014/0293047 A1* | 10/2014 | Morris .................... | E02F 9/261 348/143 |
| 2014/0293051 A1* | 10/2014 | Nakamura et al. ........... | 348/148 |

FOREIGN PATENT DOCUMENTS

| | | |
|---|---|---|
| JP | H11-213154 | 8/1999 |
| JP | 2005-163370 | 6/2005 |
| JP | 2006-144388 | 6/2006 |
| JP | 398777 | 10/2007 |
| JP | 2010-060344 | 3/2010 |
| WO | 2011-067456 | 6/2011 |

* cited by examiner

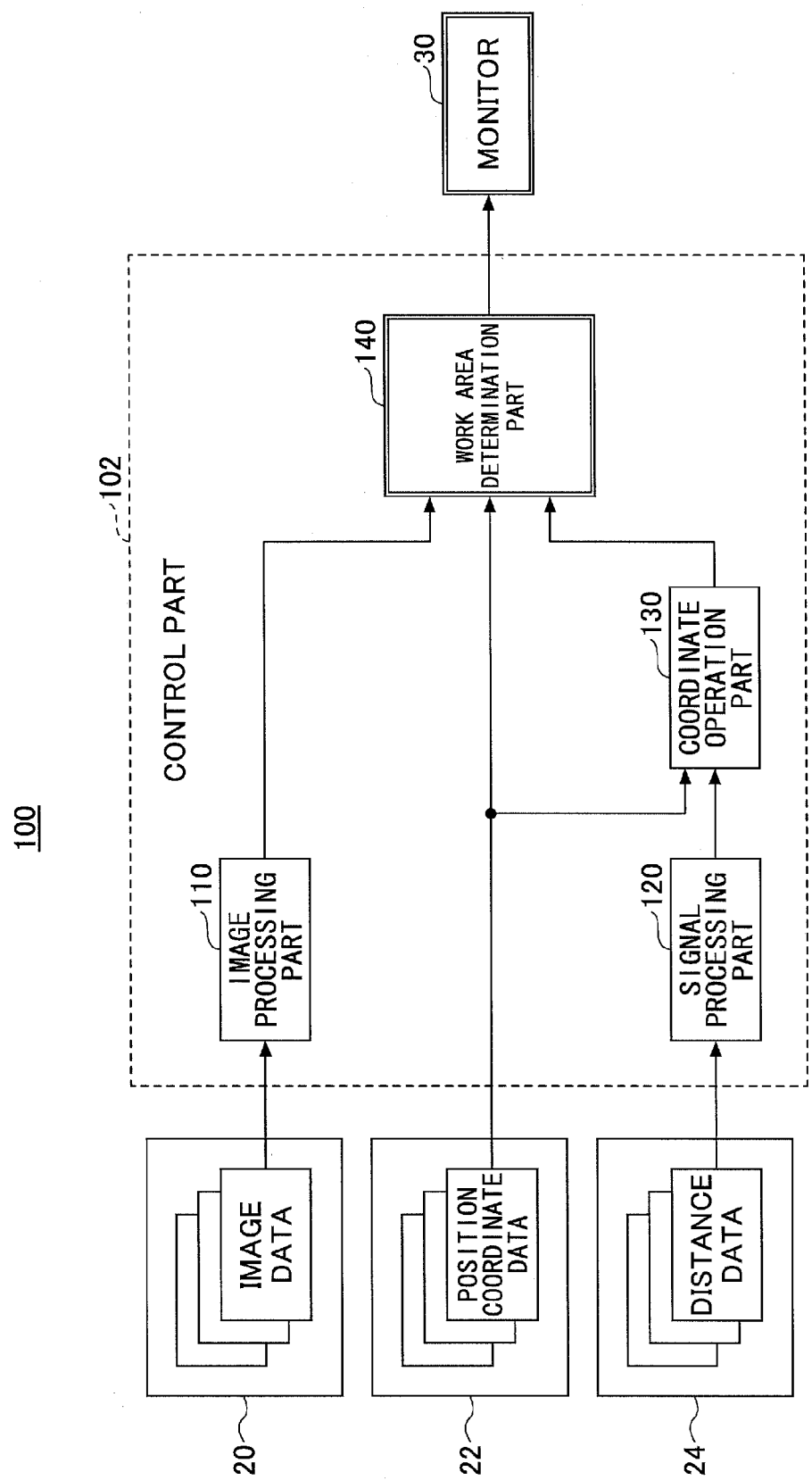

IMAGE DISPLAY APPARATUS FOR SHOVEL

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2012/080517, filed on Nov. 26, 2012 and designating the U.S., which claims priority to Japanese Patent Application No. 2011-284095, filed on Dec. 26, 2011. The entire contents of the foregoing applications are incorporated herein by reference.

BACKGROUND

Technical Field

The present invention relates to image display apparatuses that display an image of a work area of a shovel.

Description of Related Art

In general, an operator of a construction machine such as a shovel operates a work element of a shovel, sitting on an operator seat in a cabin and looking at a work site. The typical work of shovels is, for example, digging earth and sand and loading the bed of a truck with the dug-out earth and sand. In this case, first, the operator digs earth and sand with a bucket while looking at an excavation site. Thereafter, the operator moves the bucket to above the bed of the truck, and dumps out the earth and sand inside the bucket onto the truck while looking at the earth and sand loaded onto the bed of the truck.

In the above-described work, first, the operator looks at the condition of the earth and sand of the excavation site and determines a part to be dug with the bucket, formally, the operator determines the part to be dug by the depressions and elevations (undulations) of the excavation site. In the case of digging a hole in the excavation site, the operator further digs a depressed part for a deeper hole. In the case of flattening the excavation site, the operator flattens out projecting parts. Thus, shovel operators often perform excavation work while determining the distribution of depressions and elevations of an excavation site.

Furthermore, in the work of loading the bed of the truck with earth and sand, the operator dumps out earth and sand onto part of the bed of the truck that has been loaded with less earth and sand. That is, the operator performs the work of dumping out earth and sand onto a part of the earth and sand that is lower in level while determining the distribution of depressions and elevations of the earth and sand loaded on the bed of the truck.

Shovel operators perform work, successively determining the conditions of a work site as described above, and are therefore required to recognize the conditions of the work site all the time.

Here, a shovel has been proposed that displays an image captured with a camera provided on the counterweight of a shovel on a monitor in an operator room and provides the operator with an image of the backside or diagonal backside that is blind to the operator at the time of operation.

SUMMARY

According to an embodiment of the present invention, an image display apparatus for a shovel that includes a lower-part traveling body, an upper-part turning body turnably placed on the lower-part traveling body, and an attachment mounted on the upper-part turning body, and performs work in a work area by driving the attachment, includes an image display part configured to display the work area to be subjected to the work. An image of the work area captured with an image capturing device is subjected to image processing to add and indicate a distribution of depressions and elevations of the work area, and is displayed on the image display part.

It is to be understood that both the foregoing general description and the following detailed description are exemplary and explanatory and not restrictive of the invention.

BRIEF DESCRIPTION OF THE DRAWINGS

FIG. 4 is a block diagram illustrating an overall configuration of the image display apparatus.

DETAILED DESCRIPTION

Sight from the operator seat of the shovel is limited. For example, if there are large depressions and elevations in an excavation site, it is impossible for the operator to visually recognize how it is shaped beyond an elevation. Furthermore, in the case where a work area is above the operator as in the case of the bed of a truck, the operator looks up at the bed. Therefore, the operator is prevented from having a view of the entire inside of the bed, and is thus prevented from recognizing the condition of earth and sand loaded onto the bed.

Furthermore, an image is captured with the camera and displayed on the monitor only to the extent that the outline of a displayed object may be determined. The operator of the shovel is not performing work, looking only at the monitor. Furthermore, the monitor screen is extremely small compared with a visual field. Accordingly, the size of an object displayed on the monitor screen is much smaller than in an actual view. For these reasons, the operator of the shovel is prevented from instantaneously recognizing for example, a distribution of fine depressions and elevations in a work area from an image displayed on the monitor.

Thus, performing work in a situation where an operator is prevented from having a good understanding of the condition of a work area results in, for example, an error in the excavation position. Furthermore, an error may be caused in the position at which the bed of a truck is loaded with earth and sand. Accordingly, the work efficiency of the shovel may be reduced by extra work for correcting such positional errors or re-performing work.

According to an aspect of the present invention, an image display apparatus for a shovel is provided that enables a shovel operator to instantaneously recognize the conditions of a work area through an image displayed on a monitor.

According to an aspect of the present invention, the distribution of depressions and elevations in a work area is displayed in an image. Therefore, even in the case where it is impossible or difficult to view the conditions of the work area, it is possible for an operator to instantaneously recognize a position at which work is to be performed and to perform work at an exact position. As a result, it is possible to improve the work efficiency of the shovel.

A description is given below, based on the drawings, of an embodiment of the present invention.

Figure 1:
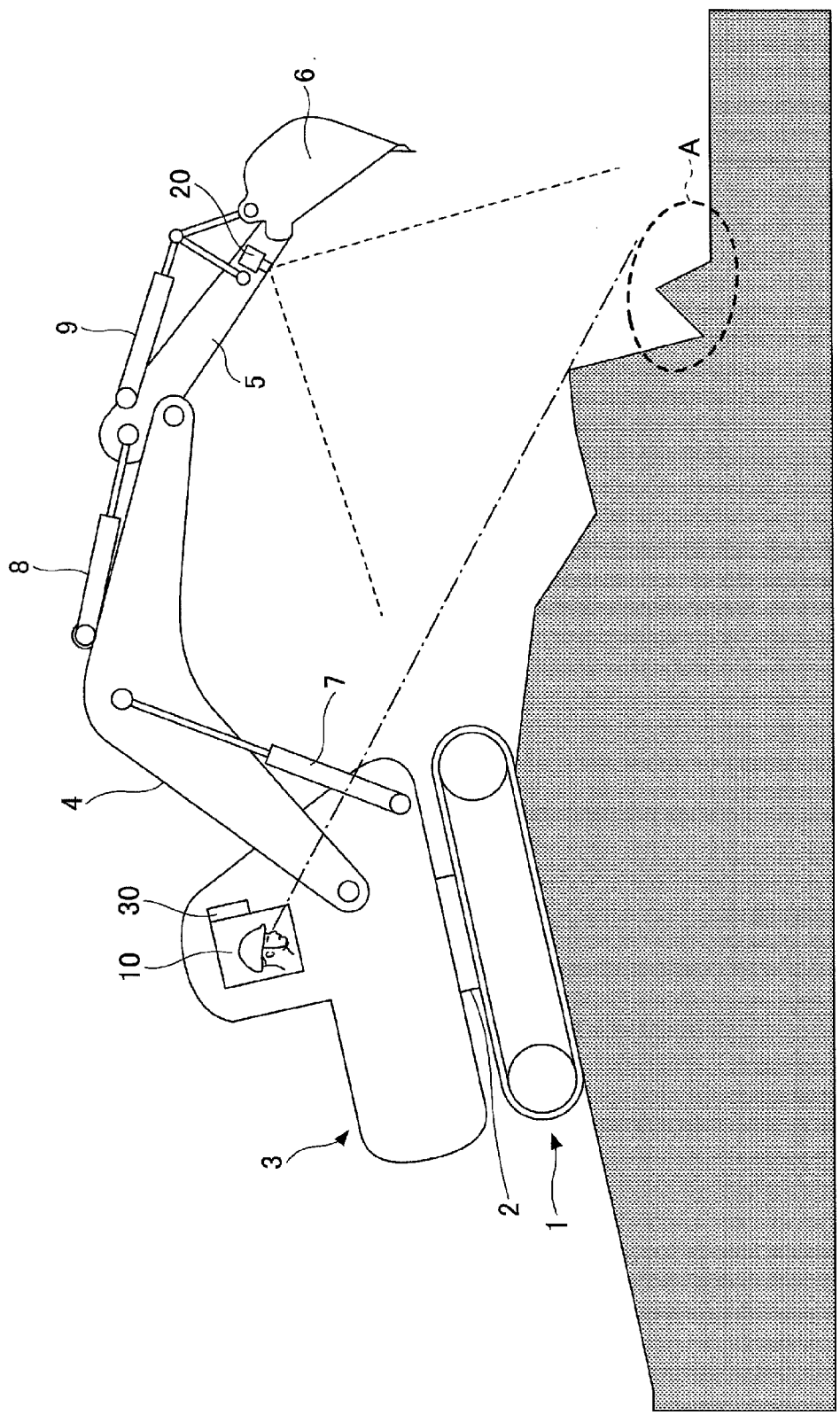
FIG. 1 is a side view of a shovel provided with an image display apparatus according to an embodiment of the present invention.

FIG. 1 is a side view of a shovel provided with an image display apparatus according to an embodiment of the present invention, illustrating a state during excavation work.

The shovel includes a lower-part traveling body as a drive part for traveling. An upper-part turning body 3 is mounted on the lower-part traveling body 1 through a turning mechanism 2. A boom 4 is attached to the upper-part turning body 3. An arm 5 is attached to an end of the boom 4, and a bucket 6 is attached to an end of the arm 5. The boom 4, the arm 5, and the bucket 6 are hydraulically driven by a boom cylinder 7, an arm cylinder 8, and a bucket cylinder 9, respectively. The boom 4, the arm 5, and the bucket 6 are configured as attachments of the shovel. Work operations such as excavation and flattening in a work area are performed by driving the attachments.

A cabin 10 is provided on the upper-part turning body 3 as an operator room in which an operator seat and an operation apparatus are placed. Power sources such as an engine, hydraulic pumps, and a hydraulic circuit are mounted behind the cabin 10 on the upper-part turning body 3.

The configuration of a drive system of the shovel, is the same as that, of drive systems of common shovels, and its description is omitted.

FIG. 1 illustrates a state where the shovel is performing excavation work. In the excavation work, some part of a work area, such as a part A in FIG. 1, is not visible from an operator because of depressions and elevations of the work area. Therefore, in this embodiment, a camera 20 is provided at an end of the arm 5 of the shovel, an image of the work area is captured with the camera 20, and the obtained image is displayed on a monitor (an image display part) 30 at the operator seat.

Because an image of the work area may be captured from directly above the work area with the camera 20, it is possible to capture an image of a part (the part A in FIG. 1) that is not visible to the operator. Accordingly, it is possible for the operator to check the conditions of the entire work area by looking at the screen of the monitor 30.

Images captured with the camera 20, however, are not very sharp, and the monitor 30 is limited in size. Accordingly, the operator cannot immediately understand the conditions of depressions and elevations, such as which part is low and which part is high, by looking at a work area displayed on the monitor 30. Therefore, according to an image display apparatus of this embodiment, an image captured with the camera 20 is displayed on the monitor 30 with the addition of an image indicating depressions and elevations in a region inside the image. The image indicating depressions and elevations is, for example, contour lines that indicate parts of the same height in the image, and is an image displayed in such a manner as to indicate mountains and valleys in common maps so as to facilitate an understanding of depressions and elevations in a planar image. A detailed description is given of the image indicating depressions and elevations in relation to the loading of earth and sand illustrated in FIG. 2.

Figure 2:
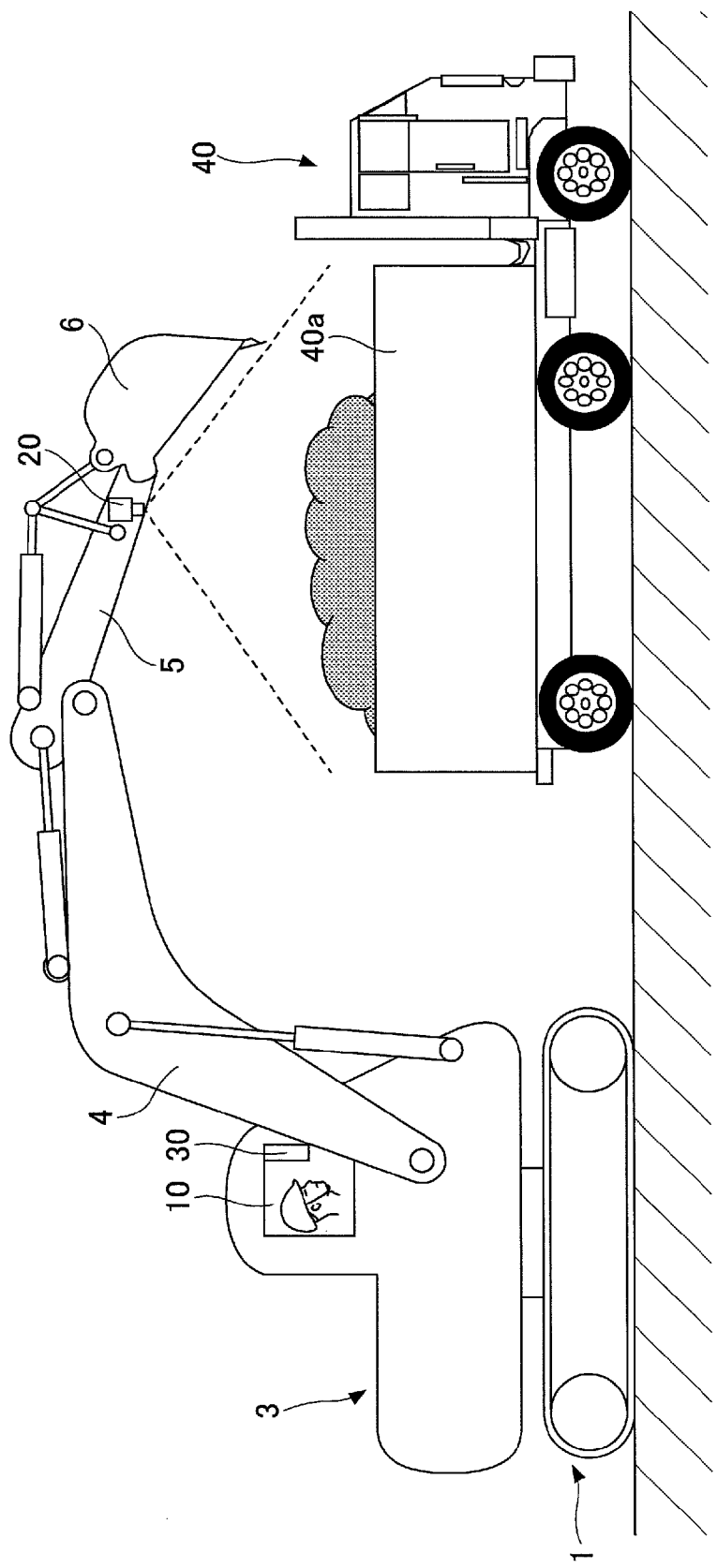
FIG. 2 is a side view of a shovel performing the work of loading a bed of a truck with the earth and sand of a bucket.

FIG. 2 is a side view illustrating a state where the earth and sand scooped up with the bucket 6 is being loaded onto the bed of a truck. The earth and sand needs to be loaded onto a bed 40a of a truck 40 to be uniform in height. In the situation illustrated in FIG. 2, however, the operator would dump out the earth and sand inside the bucket 6 onto an approximate position because the operator is prevented from looking inside the bed 40a of the truck 40.

Therefore, according to this embodiment, an image of the bed 40a of the truck 40 captured with the camera 20 is displayed on the monitor 30 in the operator room of the shovel. At this point, the image captured with the camera 20 is displayed with the addition of contour lines indicating depressions and elevations as illustrated in FIG. 3, so as to enable the operator to immediately recognize depressions and elevations in the work area.

Figure 3:
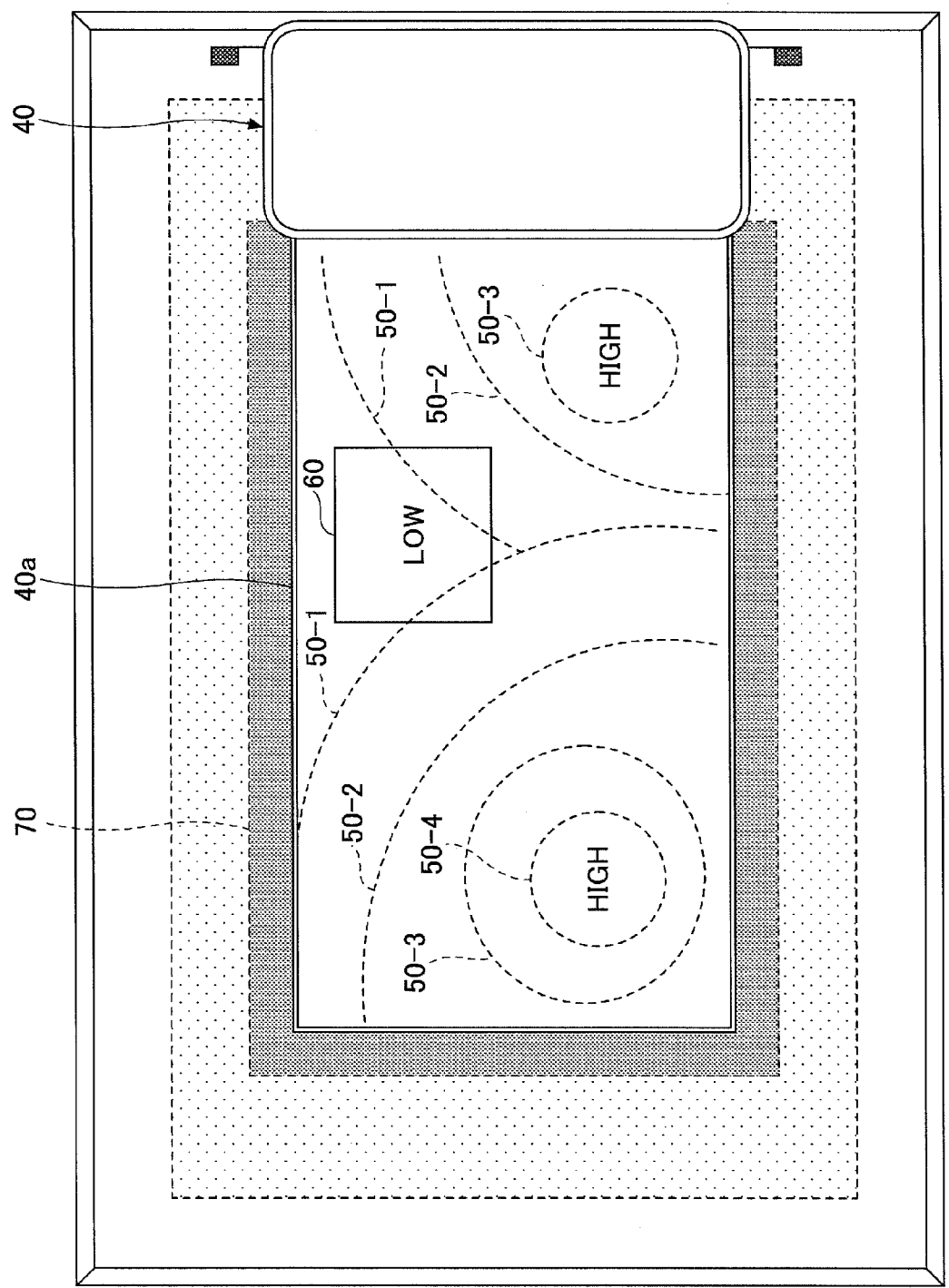
FIG. 3 is a diagram illustrating an image displayed by the image display apparatus according to the embodiment of the present invention.

FIG. 3 is a diagram illustrating a screen of the monitor 30 at the time when an image of the bed 40a of the truck 40 captured with the camera 20 is displayed on the monitor 30 with the addition of contour lines (dotted lines) thereto. On the screen of the monitor 30, the entire bed 40a of the truck 40 is displayed, and contour lines 50-1 through 50-4 are displayed so that the undulations of the earth and sand inside the bed 40a may be recognized.

In the loading work, it is necessary to load earth and sand onto the entire bed 40a as uniformly as possible by dumping out earth and sand onto parts that are lower in level (depressed parts). Therefore, the operator of the shovel determines the undulations (depressions and elevations) of the earth and sand on the bed 40a based on the contour lines 50-1 through 50-4 displayed on the screen of the monitor 30 where the bed 40a of the truck 40 is displayed, and dumps out the earth and sand in the bucket 6 onto lower parts. Even in the case where it is difficult to recognize undulations (depressions and elevations) with the screen of the monitor 30 alone, it is possible to immediately determine undulations (depressions and elevations) by looking at the contours 50-1 through 50-4, so that the work efficiency is improved. Furthermore, there is no need to perform extra work, such as discharging earth and sand further onto higher parts and flattening them afterward, so that it is possible to further improve the efficiency of work by the shovel.

In the case illustrated in FIG. 3, of the contour lines 50-1 through 50-4, the contour lines 50-1 are lines that connect the lowest parts, the contour lines 50-2 are lines that connect the next lowest parts, the contour lines 50-3 are lines that connect the third lowest parts, and the contour line 50-4 is a line that connects the highest parts. The interval (difference in height) between contour lines may be set to an appropriate value, for example, 30 cm. Alternatively, the interval between contour lines may be set to a predetermined value in advance or be set by inputting a value that facilitates the operator's understanding.

Furthermore, the contour lines 50-1 through 50-4 may be assigned different colors. For example, the contour lines 50-1 that indicate the lowest positions may be in blue, the contour line 50-4 that indicates the highest positions may be in red, and the intervening contour lines 50-2 and 50-3 may be in appropriate colors such as those gradually changing frosts blue to red. Alternatively, the entire image may be subjected to coloring or hatching with the same color or hatching being applied to a part of the same height (the region between adjacent contour lines), so that undulations (depressions and elevations) may be gradually displayed in the entire image.

A determination as to undulations (depressions and elevations) in the work area may be made by the image display apparatus processing an image in the work area and performing image recognition. Alternatively, the undulations may be determined by measuring the distances between multiple positions in the work area and the camera 20 by incorporating a distance sensor in the camera 20. The distance sensor may be, for example, a reflective distance sensor.

Furthermore, in the case illustrated in FIG. 3, an instruction area frame 60 that indicates a work instruction area is further displayed in addition to the contour lines 50-1 through 50-4 on the screen of the monitor 30. The area surrounded by the instruction area frame 60 is the work instruction area, in the case illustrated in FIG. 3, the instruction area frame 60 is an area loaded with less earth and sand in the bed 40a, and is an area yet to be loaded with earth and sand. The image display apparatus, based on the contents of work, specifies an area to be worked on (that is, a work instruction area) in the image of a work area displayed on the monitor 30 and displays the area to be worked on by surrounding the area to be worked on with the instruction area frame 60 on the screen. In the case illustrated in FIG. 3, because the work is the loading of earth and sand, a part of the earth and sand that is lower in level is displayed as the work instruction area surrounded by the instruction area frame 60, so as to make the height of the earth and sand as uniform as possible.

When the work is, for example, excavation, an area to be excavated is displayed as the work instruction area surrounded by the instruction area frame 60. Furthermore, when the work is to flatten out earth and sand, a part of the earth and sand that is higher in level (an elevated part) is displayed as the work instruction area surrounded by the instruction area frame 60.

The display of the work instruction area is not limited to surrounding a work instruction, area with the instruction area frame 60 as illustrated in FIG. 3. For example, the work instruction area may be displayed by performing such image processing as to make the work instruction area distinguishable from other areas, such as coloring or hatching the work instruction area.

An image displayed on the monitor 30 is of the entire work area in which excavation or loading is performed with the shovel. It is also possible to display the entire work area inside the image on the monitor 30 by registering the position of the work area as a coordinate position in advance. In FIG. 3, the work area is a part surrounded by a dotted line frame 70. The coordinate position of the work area may be detected along with the coordinate position of the shovel using a GPS function. In this case, a GPS device is incorporated into the camera 20. If possible, undulations (depressions and elevations) in the work area may also be determined by the GPS function.

FIG. 4 is a system configuration diagram of an image display apparatus 100 according to this embodiment. The image display apparatus 100 includes a control part 102 that includes an image processing part 110, a signal processing part 120, a coordinate operation part 130, and a work area determination part 140.

The image data of a work site captured with the camera 20 are transmitted to the image processing part 110. The image processing part 110 processes the image data into image data to be displayed on the monitor 30. The image data processed in the image processing part 110 are transmitted to the work area determination part 140.

In the case where a GPS device 22 is incorporated in the camera 20, the position coordinate data of the camera 20 detected by the GPS function are transmitted to the work area determination part 140. The position coordinate data are fed to the coordinate operation part 130 as well.

Furthermore, in the case where a distance sensor 24 is incorporated in the camera 20, distance data are transmitted to the signal processing part 120. The distance data are data that represent the distance from the camera 20 to each of positions in the work area. The distance data processed in the signal processing part 120 are fed to the coordinate operation part 130. The coordinate operation part 130 creates the position coordinate data of an area with respect to which the distance has been measured by correlating the positions measured by the distance sensor 24 with the position coordinate data, based on the position coordinate data from the GPS device 22 and the distance data from the distance sensor 24, and outputs the position coordinate data to the work, area determination part 140.

The work area determination part 140 creates an image to foe displayed on the monitor 30 using the image data from the image processing part 110, the position coordinate data from the GPS device 22, and the position coordinate data from the coordinate operation part 130, and transmits monitor image data to the monitor 30. The work area determination part 140 recognizes undulations (depressions and elevations) in the image from the image data from the camera 20, and adds data representing the contour lines 50-1 through 50-4 to the image data. Alternatively, in the case where the data representing undulations (depressions and elevations) (distance data) are fed from the distance sensor 24, the data representing the contour lines 50-1 through 50-4 may be created based on the position coordinate data fed from the coordinate operation part 130.

Furthermore, the work area determination part 140 specifies a work instruction area to be worked on inside the dotted line frame 70 indicating a work area based on the data representing differences in height, and generates data indicating the instruction area frame 60. As described above, in the case of the loading of earth and sand (this information is input in advance by the operator), the instruction area frame 60 is formed so as to surround a part that is lower in level in the work area.

The image data created in the work area determination part 140 are transmitted to the monitor 30 provided in the operator room of the shovel and are displayed on the screen of the monitor 30. It is possible for the operator to efficiently perform work by performing work, viewing the contour lines and the work instruction area on the screen of the monitor 30.

Here, in the case where the control, part 102 of the image display apparatus 100 is provided in the shovel, the data from the camera 20, the GPS device 22, and the distance sensor 24 are transmitted to the control part 102 via interconnects inside the shovel. Furthermore, the image data to be displayed on the monitor 30 also are transmitted to the monitor 30 via interconnects inside the shovel. Each of the camera 20, the GPS device 22, the distance sensor 24, and the monitor 30 does not necessarily have to be connected to the control part 102 via interconnects, and the data may be transmitted by radio transmission. The above-described embodiment, of which a description is given, taking loading work as an example, is also effective for flattening work that requires formation of a horizontal surface.

Employment of radio transmission makes it possible to install the control part 102 and the monitor 30 in a location distant from the shovel. For example, in the case of performing work by remotely operating the shovel, a remote operator is often prevented from having a view of a work area. Even in such a case, by remotely operating the shovel while displaying an image based on the image data generated by the image display apparatus according to this embodiment, it is possible to efficiently accomplish work. Furthermore, the monitor (image display part) 30 according to this embodiment may be implemented by a screen of a portable information terminal, such as a smartphone.

Embodiments of the present invention may be applied to an image display apparatus that displays an image of a work area of a shovel.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An image display apparatus for a shovel that includes a lower-part traveling body, an upper-part turning body turnably placed on the lower-part traveling body, and an attachment mounted on the upper-part turning body, and performs work in a work area by driving the attachment, the image display apparatus comprising:
    a processing part configured to process a surface image of the work area captured with a camera by subjecting the captured surface image to image processing that adds a distribution of depressions and elevations of the work area to the captured surface image; and
    an image display part configured to display the processed captured surface image of the work area,
    wherein the image processing further adds an instruction area to the captured surface image, the instruction area indicating an area to be worked on, and
    wherein the image display part is configured to display the captured surface image of the work area with the instruction area indicated thereon by a frame, the frame being inside the work area and surrounding the instruction area.

2. The image display apparatus for the shovel as claimed in claim 1, wherein the instruction area indicates a part higher than another part in the work area with respect to the depressions and the elevations of the work area.

3. The image display apparatus for the shovel as claimed in claim 1, wherein the instruction area indicates a part lower than another part in the work area with respect to the depressions and the elevations of the work area.

4. The image display apparatus for the shovel as claimed in claim 1, wherein the work area whose coordinates are set in advance is displayed on the image display part.

5. The image display apparatus for the shovel as claimed in claim 1, wherein the image display part is installed in a location distant from the shovel.

6. The image display apparatus for the shovel as claimed in claim 1, wherein the image processing that adds the distribution of the depressions and the elevations of the work area is to display contour lines.

7. The image display apparatus for the shovel as claimed in claim 6, wherein the contour lines are gradually colored.

8. The image display apparatus for the shovel as claimed in claim 1, wherein the image processing that adds the distribution of the depressions and the elevations of the work area is to perform hatching.

9. The image display apparatus for the shovel as claimed in claim 1, wherein the image display part is provided in an operator room.

10. The image display apparatus for the shovel as claimed in claim 1, wherein the processing part is configured to generate data indicating the frame based on information input to the processing part.

11. An image display system for a shovel that includes a lower-part traveling body, an upper-part turning body turnably placed on the lower-part traveling body, a boom attached to the upper-part turning body, an arm attached to the boom, and a bucket attached to the arm, the image display system comprising:
    a camera provided at an end of the arm so as to capture a surface image of a work area in which the shovel performs work by driving the boom, the arm, and the bucket; and
    an image display apparatus, the image display apparatus including
        a processing part configured to process the surface image of the work area captured with the camera by subjecting the captured surface image to image processing that adds a distribution of depressions and elevations of the work area to the captured surface image; and
        an image display part configured to display the captured surface image of the work area.

* * * * *